US009441768B2

(12) United States Patent
Cittadini Bellini

(10) Patent No.: US 9,441,768 B2
(45) Date of Patent: Sep. 13, 2016

(54) PIPE-JOINING APPARATUS FOR PRODUCING UNDERWATER PIPELINES

(71) Applicant: Saipem S.p.A., San Donato, Milanese (IT)

(72) Inventor: Serafino Cittadini Bellini, Ascoli Piceno (IT)

(73) Assignee: Saipem S.p.A., Milan (IT)

( * ) Notice: Subject to any disclaimer, the term of this patent is extended or adjusted under 35 U.S.C. 154(b) by 355 days.

(21) Appl. No.: 13/955,948

(22) Filed: Jul. 31, 2013

(65) Prior Publication Data

US 2013/0312915 A1    Nov. 28, 2013

Related U.S. Application Data

(63) Continuation of application No. 13/302,200, filed on Nov. 22, 2011, now Pat. No. 8,910,852, which is a continuation of application No. 12/448,194, filed on Aug. 13, 2009, now Pat. No. 8,061,582.

(30) Foreign Application Priority Data

Dec. 14, 2006  (IT) .............................. MI2006A2402
Dec. 14, 2007  (WO) ................. PCT/EP2007/063903

(51) Int. Cl.
*F16L 13/00*     (2006.01)
*B23K 37/053*    (2006.01)
(Continued)

(52) U.S. Cl.
CPC ............ *F16L 13/00* (2013.01); *B23K 37/0533* (2013.01); *B29C 47/021* (2013.01);
(Continued)

(58) Field of Classification Search
CPC ................ B23K 37/0533; B29C 2947/92904;
B29C 47/0021; B29C 47/021; B29C 47/0866;
B29C 47/028; B29C 47/0806; B29C 47/126;
B29C 47/92; B29C 2947/9258; B29C
2947/926; F16L 1/26; F16L 13/0272; F16L
58/181; F16L 13/00
USPC ............... 228/176; 219/61, 60 A, 61 A, 105,
219/125.1, 125.11, 10; 156/153, 500, 187;
427/299, 422; 118/407, 410, 428;
425/382.3, 365, 133.1, 133.5;
264/211.2
See application file for complete search history.

(56) References Cited

U.S. PATENT DOCUMENTS

| 3,834,261 A  * | 9/1974 | Behrendt ................ B21C 35/04 83/161 |
| 8,231,943 B2 * | 7/2012 | Perez ...................... B29C 63/14 427/375 |
| 2009/0065124 A1* | 3/2009 | Culzoni ................ B05D 7/146 156/153 |

FOREIGN PATENT DOCUMENTS

JP         61 215042        9/1986

OTHER PUBLICATIONS

European Search Report mailed Apr. 8, 2016 in European Application No. 15179485.6.

*Primary Examiner* — Scott Kastler
*Assistant Examiner* — Michael Aboagye
(74) *Attorney, Agent, or Firm* — Davidson Berquist Jackson & Gowdey LLP

(57) ABSTRACT

A field joint coating unit for coating a cutback area along a pipeline in which the apparatus includes an extruder having an extrusion outlet positioned adjacent and facing the cutback area so that a protective sheet can be extruded having a width that exceeds an axially extending width of the cutback area, and a mechanism supporting the extruder and its tank, the extrusion outlet, and a roller for compressing the protective sheet onto the cutback area in which the mechanism rotate the extruder, the tank, the extrusion outlet, and the roller about the pipeline as the protective sheet is extruded while maintaining the position of the extrusion outlet relative to the cutback area.

23 Claims, 6 Drawing Sheets

(51) Int. Cl.
*B29C 47/02* (2006.01)
*F16L 1/26* (2006.01)
*F16L 13/02* (2006.01)
*F16L 58/18* (2006.01)
*B29C 47/08* (2006.01)
*B29C 47/12* (2006.01)
*B29C 47/92* (2006.01)
*B29C 47/00* (2006.01)

(52) U.S. Cl.
CPC ........ *B29C 47/028* (2013.01); *B29C 47/0806* (2013.01); *B29C 47/0866* (2013.01); *B29C 47/126* (2013.01); *B29C 47/92* (2013.01); *F16L 1/26* (2013.01); *F16L 13/0272* (2013.01); *F16L 58/181* (2013.01); *B23K 2201/10* (2013.01); *B29C 47/0021* (2013.01); *B29C 2947/926* (2013.01); *B29C 2947/9258* (2013.01); *B29C 2947/92904* (2013.01)

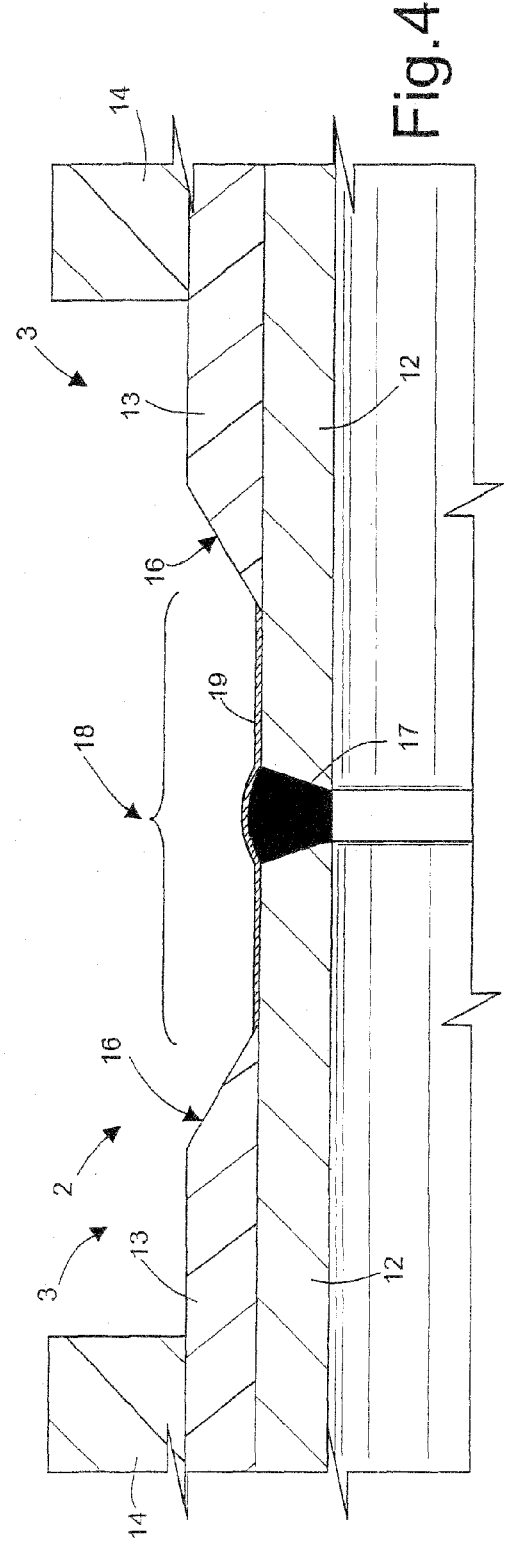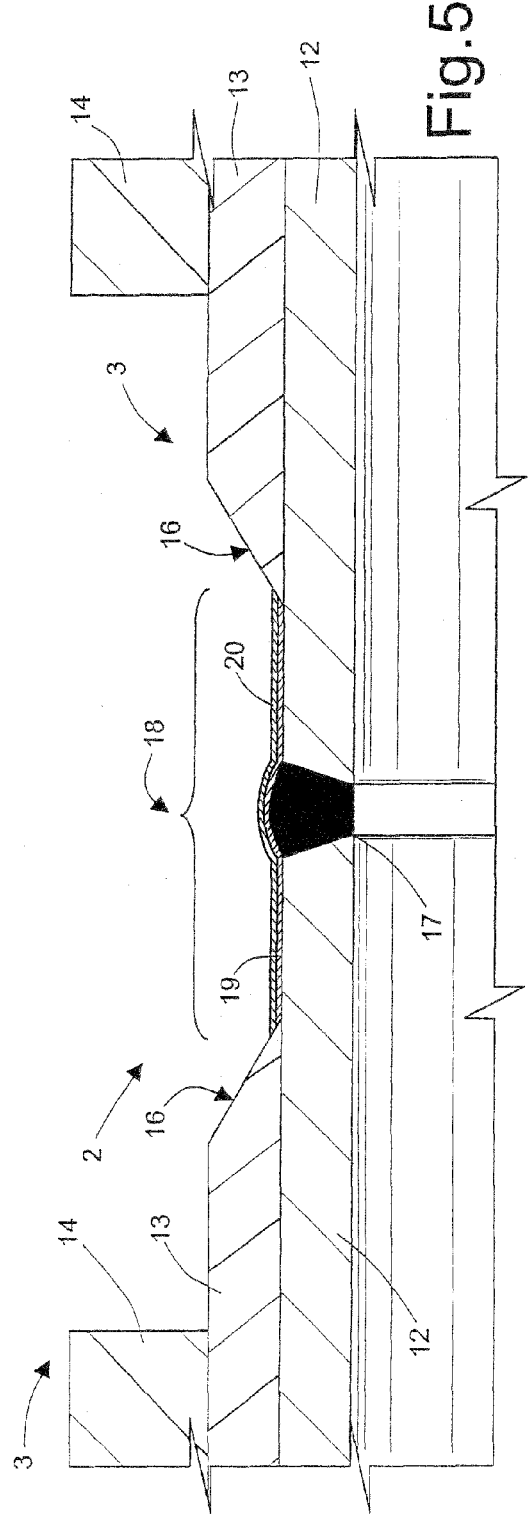

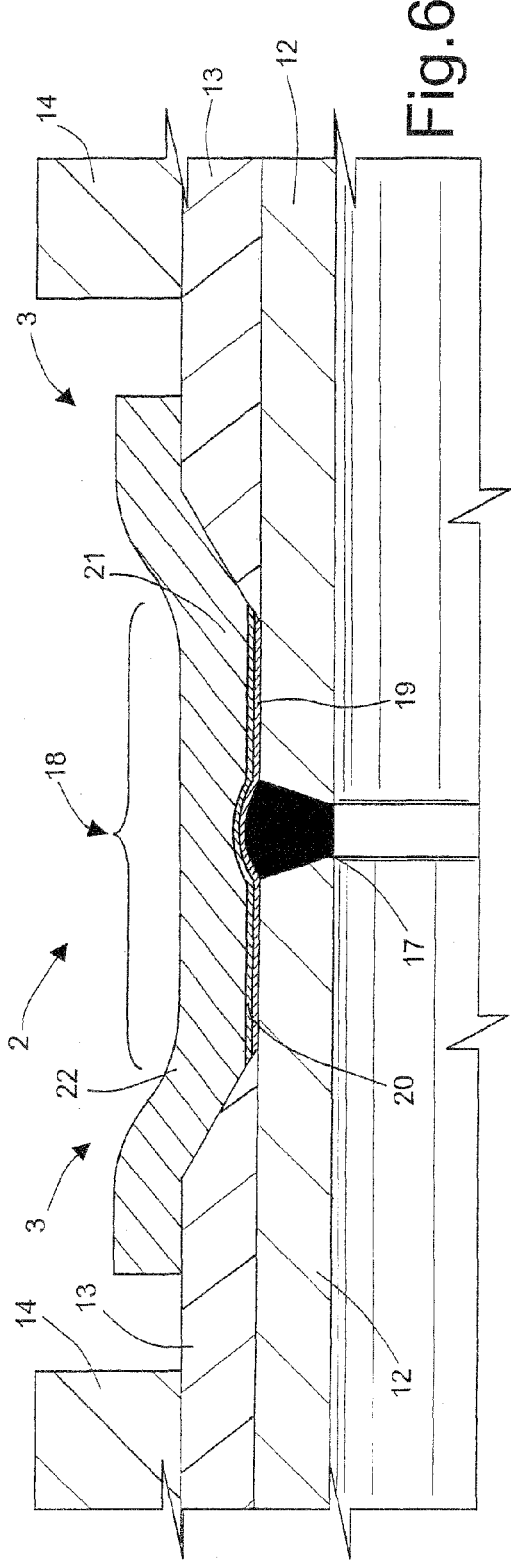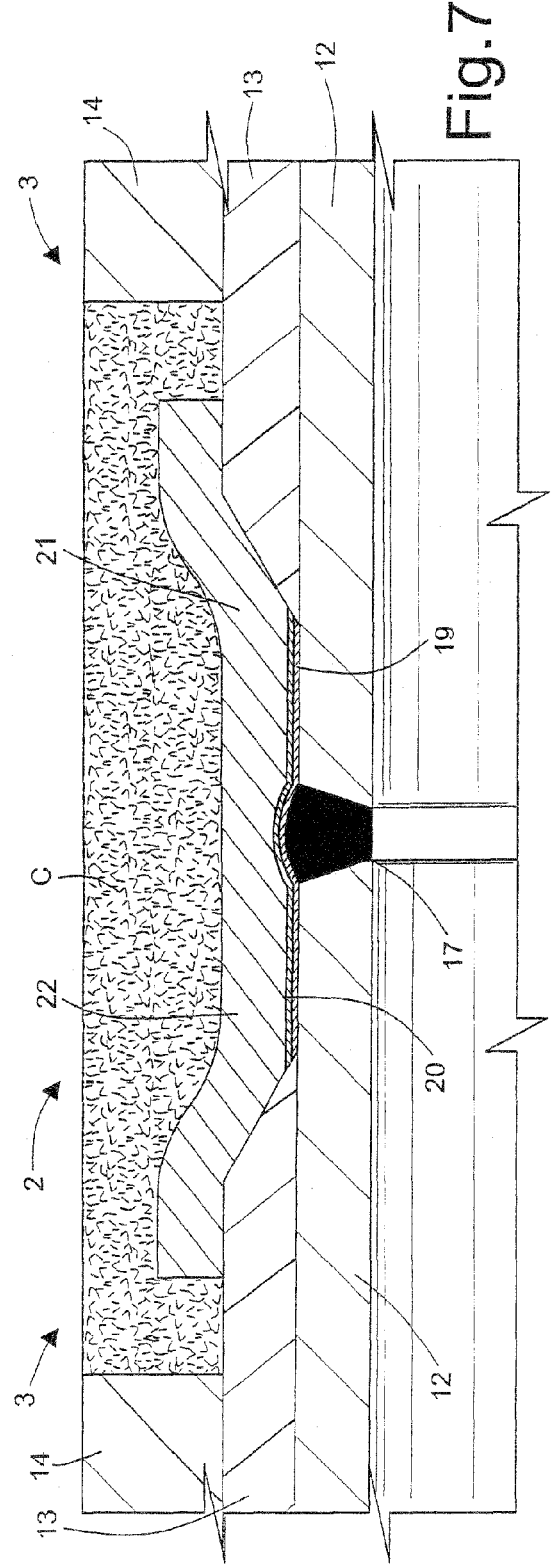

PIPE-JOINING APPARATUS FOR PRODUCING UNDERWATER PIPELINES

RELATED APPLICATIONS

This application is a continuation of U.S. application Ser. No. 13/302,200, filed Nov. 22, 2011, now U.S. Pat. No. 8,910,852, a continuation of U.S. application Ser. No. 12/448,194, filed on Aug. 13, 2009, now U.S. Pat. No. 8,061,582, a national stage application of PCT/EP2007/063903, filed on Dec. 13, 2007, and international WIPO application based on Italian Application No. MI2006A002402, filed Dec. 14, 2006, all of which are incorporated herein by reference.

TECHNICAL FIELD

The present invention relates to a pipe-joining method for producing an underwater pipeline.

The method according to the present invention comprises welding the facing free ends of two adjacent pipes, aligned along an axis, to form an annular joint portion known as cutback; and applying a protective sheet about the cutback.

BACKGROUND ART

Underwater pipelines comprise a number of pipes joined to total lengths of hundreds of kilometers. The pipes are of normally 12-meter standard length, and relatively large diameters ranging between 0.2 and 1.5 meters, and each comprise a steel cylinder; a first coating of polymer material to protect the steel pipe; and possibly a second coating of Gunite or cement to weigh down the pipe. In some applications, the pipes and underwater pipelines do not need and therefore have no second coating.

To weld the steel cylinders to one another, the opposite free ends of each pipe have no first or second coating. The pipes are joined at on-land installations into multiple-standard-length pipes, as well as on pipeline-laying vessels, on which standard-length or multiple-standard-length pipes are joined to others, in turn already joined to other pipes, to form part of the underwater pipeline.

The actual joining operation comprises welding the steel cylinders, normally in a number of weld passes, and bridging the first and, possibly, second coating. Once an annular weld is formed between two steel cylinders, a cutback with no first or second coating extends astride the weld, is defined substantially by the free ends of the pipes, extends axially between two end portions of the first coating, and must be protective coated.

Cutback protective coating is known as "field joint coating", and comprises coating the cutback with three coats to ensure protection and adhesion of the coats to the steel cylinders. More specifically, cutback protective coating comprises heating, e.g. induction heating, the cutback to 250° C.; spraying the cutback with powdered epoxy (FBE—Fusion Bonded Epoxy) resin, which, in contact with the cutback, forms a relatively thin first coat or "primer"; spraying the cutback, on top of the first coat, with a modified copolymer, which acts as adhesive and, in contact with the first coat, forms a relatively thin second coat; applying a third so-called "top coat"; and then bridging the second coating if necessary.

Welding, non-destructive weld testing, and bridging the first and second coating, are performed at joining stations equally spaced along the path of the pipes (or of the pipeline being formed, when the pipes are joined to this). The pipes are therefore advanced in steps, and are stopped at each joining station for a length of time determined by the longest operation, which, at present, is that of applying the third or top coat.

Known methods currently employed to apply the third coat include:
"cigarette wrapping", which comprises heating, winding, and compressing a number of thin sheets of polymer material about the cutback, on top of the adhesive second coat;
"spiral wrapping", which comprises heating, double-winding, and compressing a strip about the cutback, on top of the second coat;
"flame spraying" using a hot spray gun to melt and spray on polymer;
fitting a mold about the cutback, and injecting liquid polymer about the cutback, on top of the second coat;
preparing a polymer strip having a heat-shrink outer protective layer (third coat) and an adhesive inner layer (second coat); heat-shrinking the strip; and melting the adhesive inner layer so the strip adheres firmly to the first coat. This last method differs from the previous methods by simultaneously applying the second and third coat.

All the above methods of applying the third coat are extremely time-consuming. More specifically, coating large cutbacks, such as those of a 48-inch (roughly 1.2-meter) diameter steel cylinder, calls for applying a relatively long third coat, which, in addition, may be as much as 5 mm thick and 400 mm wide. In other words, since, in most cases, the mass of polymer material to be applied to form the third coat is relatively considerable, and the third coat must be plastic enough, when applied, to achieve effective chemical/mechanical adhesion to the second coat, known methods of applying the third coat do not allow a satisfactory reduction in coating time.

DISCLOSURE OF INVENTION

It is an object of the present invention to provide a pipe-joining method for producing an underwater pipeline, which comprises applying a protective sheet about the cutback, to eliminate the drawbacks of the known art.

According to the present invention, there is provided a method of joining pipes to produce an underwater pipeline, the method comprising welding the facing free ends of two adjacent pipes, aligned along an axis, to define a cutback; and winding a protective sheet about the cutback; the method being characterized in that the protective sheet is extruded close to the cutback.

Extruding the protective sheet close to the cutback means it can be applied to the cutback while still in the plastic state and at such a temperature as to achieve improved, relatively fast adhesion to the underlying coats and to the first coating. And the even temperature along the whole of the protective sheet means the whole cutback can be coated with a single protective sheet extruded to a suitable thickness.

The present invention also relates to a pipe-joining apparatus for producing underwater pipelines.

According to the present invention, there is provided an apparatus for joining pipes to produce an underwater pipeline; the apparatus comprising at least one welding unit for welding the facing free ends of two adjacent pipes, aligned along an axis, to define a cutback; and a coating unit for winding a protective sheet about the cutback; the apparatus being characterized by comprising an extruder for extruding the protective sheet at a joining station, close to the cutback.

The present invention also relates to an underwater-pipeline-laying vessel.

According to the present invention, there is provided a vessel for laying underwater pipelines, and comprising a pipe-joining apparatus as claimed.

BRIEF DESCRIPTION OF THE DRAWINGS

A non-limiting embodiment of the present invention will be described by way of example with reference to the accompanying drawings, in which:

FIGS. 4 to 7 show larger-scale sections, with parts removed for clarity, of pipes at further joining stages;

BEST MODE FOR CARRYING OUT THE INVENTION

Figure 1:
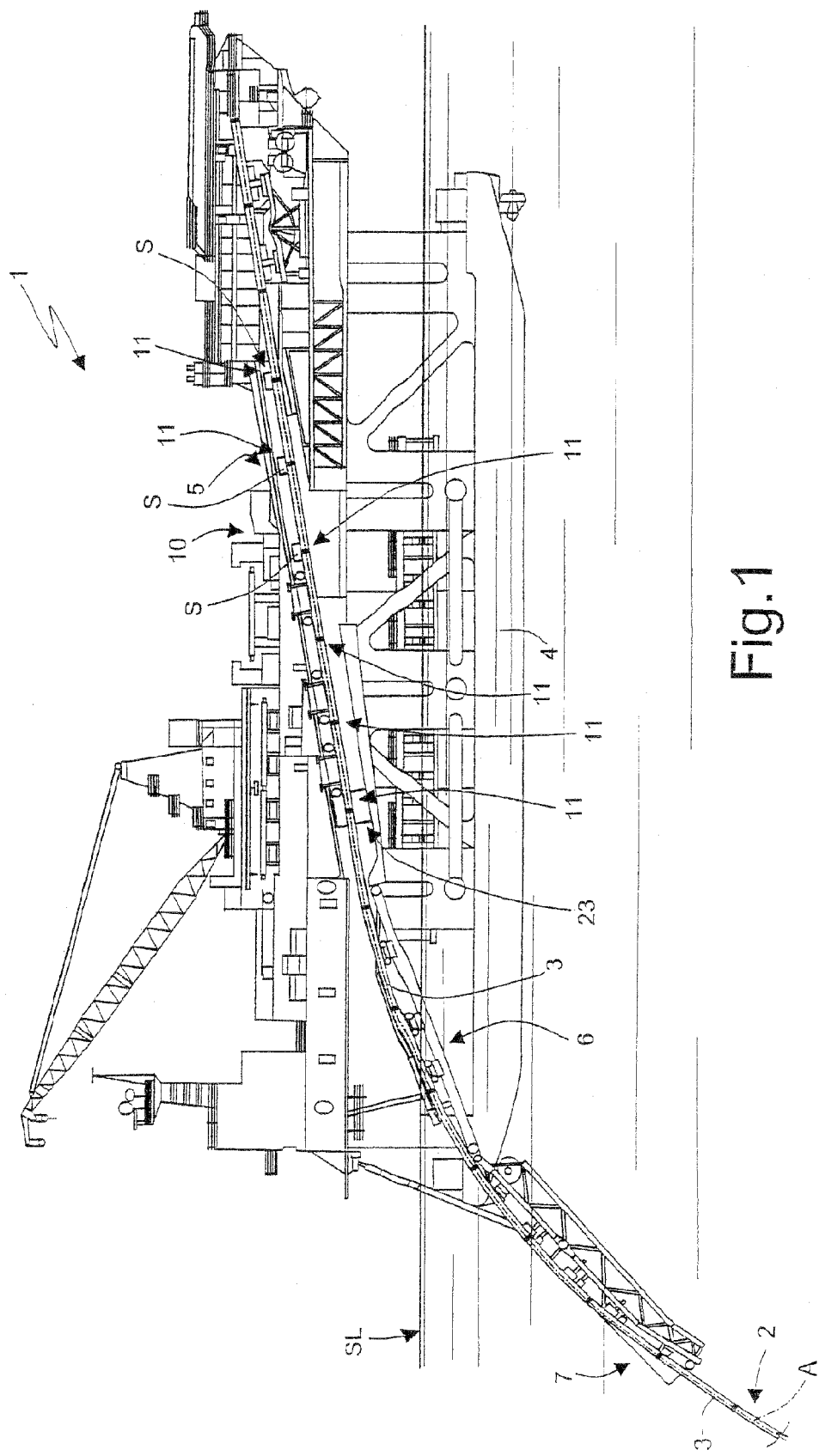
FIG. 1 shows a side view, with parts removed for clarity, of a pipeline-laying vessel implementing the pipe-joining method according to the present invention.

Number 1 in FIG. 1 indicates a pipeline-laying vessel in the process of producing and laying in the sea (SL indicates sea level) an underwater pipeline 2 comprising pipes 3 joined to one another. Vessel 1 comprises hulls 4; an above-water tunnel 5; a partly above-water, inside ramp 6; an underwater outside ramp 7; and a work line 10 extending along tunnel 5 and the above-water portion of inside ramp 6.

The partly formed underwater pipeline 2 and pipes 3 ready for joining to it extend along an axis A of work line 10, which comprises a number of joining stations 11 equally spaced along axis A, and each for performing a given operation, such as welding, non-destructive testing, or bridging a coating.

The distance between adjacent joining stations 11 equals the standard length, about 12 meters, of each pipe 3, or a multiple of the standard length, when joining, along line 10, multiple-standard-length pipes 3 joined beforehand at on-land installations or off-line on the vessel.

Figure 2:
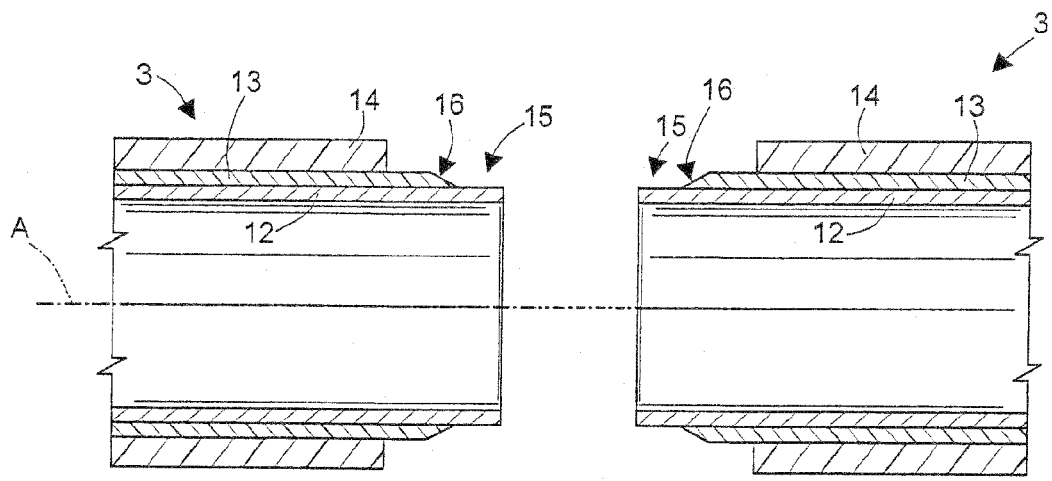
FIGS. 2 and 3 show sections, with parts removed for clarity, of pipes at various joining stages.

With reference to FIG. 2, each pipe 3 comprises a steel cylinder 12; a first coating 13, normally of polyethylene or polypropylene, contacting and for corrosion proofing steel cylinder 12; and a second coating 14 of Gunite or cement for weighing down underwater pipeline 2.

In an alternative embodiment not shown, the pipes have no second coating.

Each pipe 3 has two opposite free ends 15 (only one shown in FIGS. 2 to 6) with no first coating 13 and no second coating 14; and first coating 13 has a bevel 16 at each free end 15.

Figure 3:
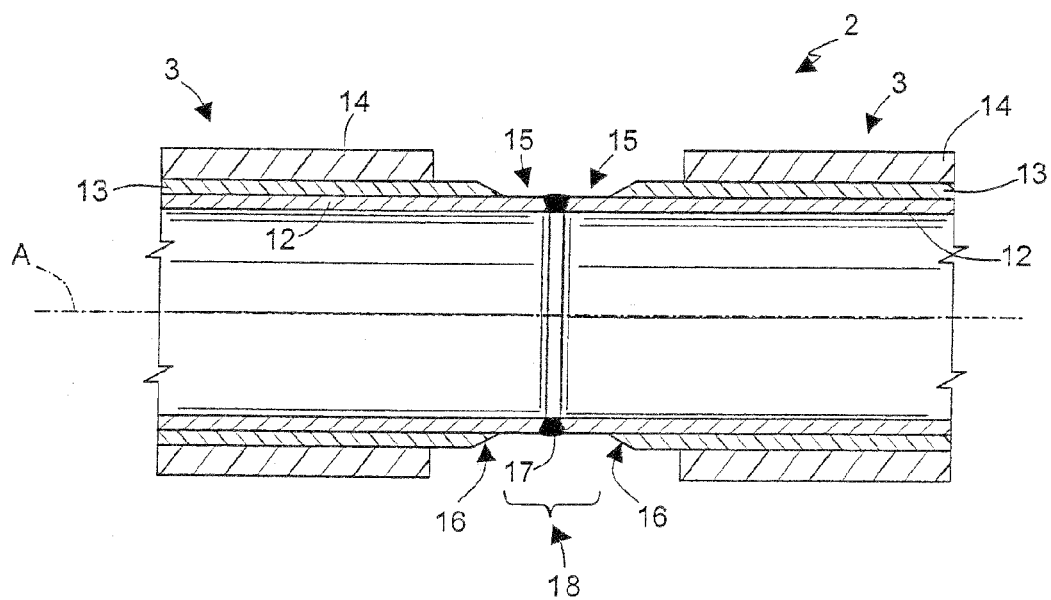

Two consecutive pipes 3, aligned along axis A (FIG. 2), are positioned with free ends 15 parallel, facing, and close together, and are welded—possibly in a number of weld passes at successive joining stations 11—to form an annular weld bead 17 between pipes 3 (FIG. 3). With reference to FIG. 3, two welded pipes 3 form a cutback 18 extending along axis A, between two successive bevels 16 of first coating 13, and along annular weld bead 17.

In addition to welding cylinders 12, joining pipes 3 also comprises bridging first coating 13 and second coating 14. Bridging first coating 13 comprises surface treating (shot peening) cutback 18; induction heating cutback 18 to 250° C.; and applying a first coat 19, second coat 20, and third coat 21 of polymer material to cutback 18 in rapid succession.

With reference to FIG. 4, first coat 19 is 100 to 500 microns thick, and is made of epoxy (FBE: Fusion Bonded Epoxy) resin applied to cutback 18 in powdered form using a spray gun not shown in the drawings.

With reference to FIG. 5, second coat 20 is 100 to 500 microns thick, and is made of a modified copolymer, normally CMPE or CMPP, applied in powdered form about cutback 18, on top of first coat 19, using a spray gun not shown in the drawings.

With reference to FIG. 6, third coat 21 is 2 to 5 mm thick, is made of a modified copolymer, normally CMPE or CMPP, applied by winding a single protective sheet 22 of modified copolymer about cutback 18 at a joining station 11, and is wide enough to overlap first coating 13. At station 11, protective sheet 22 is extruded directly, close to cutback 18, from a pasty copolymer, and is wound about cutback 18. More specifically, protective sheet 22 is advantageously extruded and wound about cutback 18 simultaneously, and is extruded thick enough to bridge first coating 13 to its original thickness in only one pass. By which is meant one 360° turn, which, for safety, is extended to 365° to overlap the free ends of protective sheet 22. Application of third coat 21 also comprises pressing protective sheet on cutback 18 to achieve chemical and mechanical adhesion between third coat 21 and second coat 20, and between third coat 21 and first coating 13 underneath.

More specifically, protective sheet 22 is advantageously also pressed simultaneously as it is extruded and wound.

Next, second coating 14 is bridged by applying a coat C of bitumen or resin, as shown in FIG. 7.

With reference to FIG. 1, vessel 1 comprises a pipe-joining apparatus 23 for joining pipes 3, and which comprises three welding units S at respective joining stations 11; a coating unit 24 (FIG. 8) for applying third coat 22 at a joining station 11; and a plastifying unit 25 (FIG. 8) close to coating unit 24.

Figure 8:
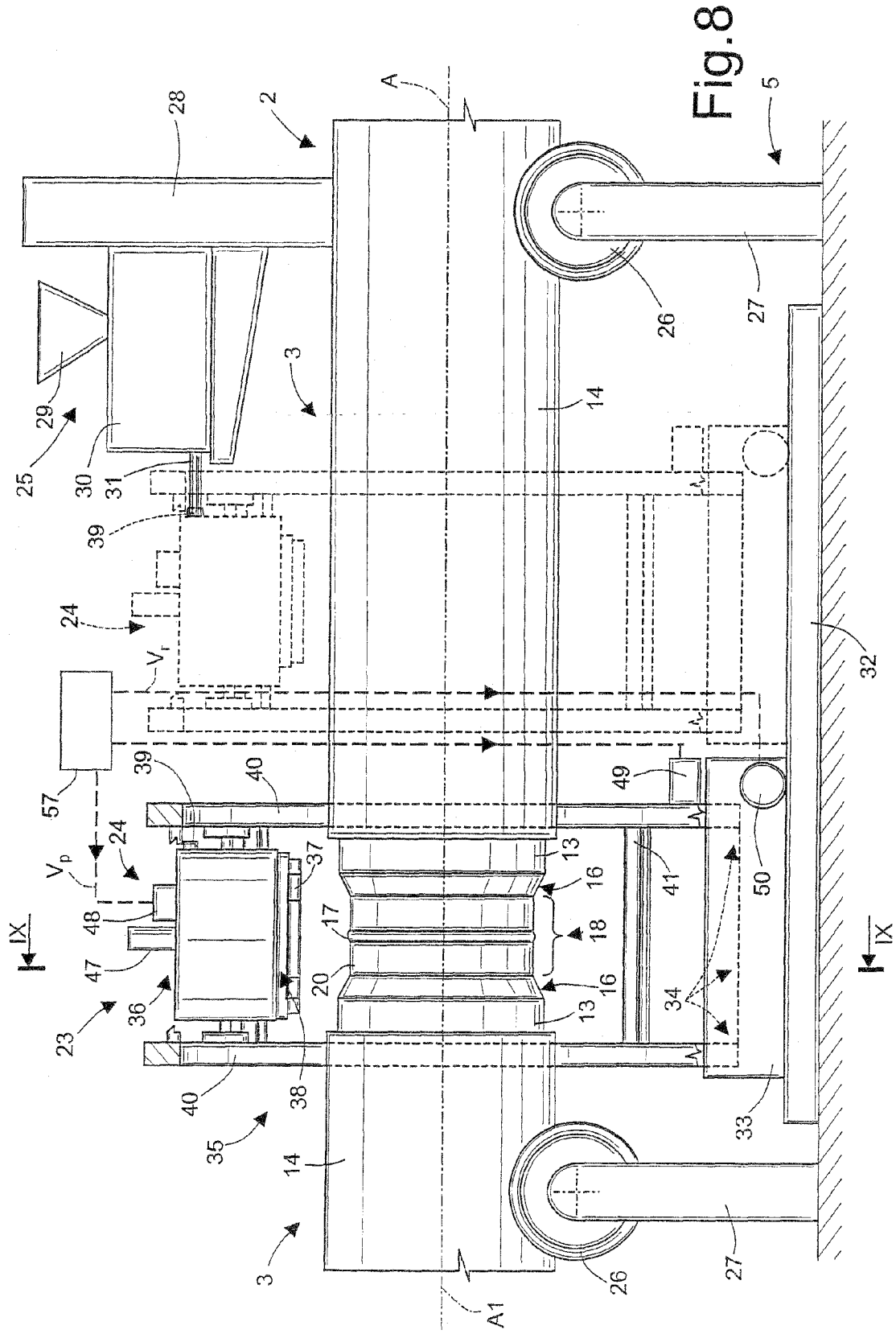
FIG. 8 shows a side view, with parts in section and parts removed for clarity, of a pipe-joining apparatus in accordance with the present invention.

With reference to FIG. 8, coating unit 24 applies third coat 21 according to the method described, which preferably comprises simultaneously extruding, winding, and pressing protective sheet 22 about cutback 18.

In FIG. 8, pipes 3 are supported and guided by rollers 26, in turn supported by uprights 27 fixed to tunnel 5. Alternatively, uprights 27 may rest on outside ramp 6 (FIG. 1).

Plastifying unit 25 plastifies the polymer, originally in the form of granules or flakes, is fixed to tunnel 5 by a structural member 28, and comprises a hopper 29, a screw extruder 30, and a nozzle 31.

Coating unit 24 comprises rails 32 fixed to tunnel 5; a carriage 33 running, parallel to axis A, along rails 32; a further rail 34 formed in carriage 32; and a wheel 35 supported on rail 34 and rotating about a respective axis A1 substantially coinciding with axis A of underwater pipeline 2.

Coating unit 24 comprises an extruder 36 and a roller 37, both supported by wheel 35. Extruder 36 comprises an outlet 38 for forming protective sheet 22, and an inlet 39 by which to feed the liquid or pasty polymer from plastifying unit 25 to coating unit 24, and is positioned with outlet 38 facing and close to cutback 18. The distance between outlet 38 and second coat 20 generally equals the thickness of third coat 21 to be applied. The radial position of extruder 36 with respect to axis A1 is adjustable by means of a powered device, not shown in the drawings, to adjust and obtain the best distance between outlet 38 and second coat 20; and extruder 36 can be tilted to adapt its position with respect to cutback 18, in the event axis A1 and axis A do not coincide perfectly.

Wheel 35 comprises two rings 40 spaced apart by spacers 41 equally spaced about axis A1; and two opposite, facing plates 42 (FIG. 9) for supporting extruder 36.

Figure 9:
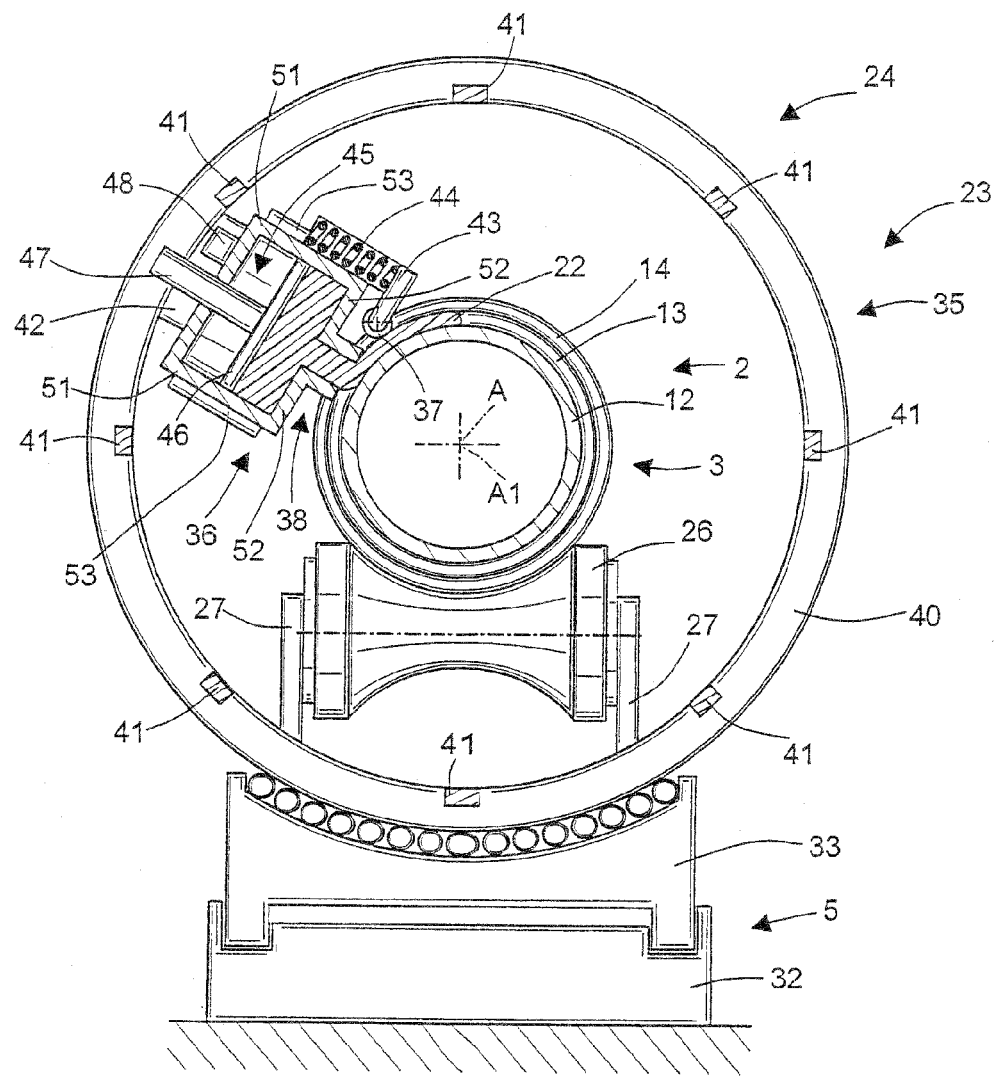
FIG. 9 shows a cross section, with parts in section and parts removed for clarity, along line IX-IX of the FIG. 8 pipe-joining apparatus.

With reference to FIG. 9, extruder 36 is mounted to slide with respect to plates 42 and radially with respect to axis A1, and is selectively adjustable with respect to axis A1. Roller 37 is supported by a member fixed adjustably to extruder 36 to adjust the position of roller 37 with respect to outlet 38. Member 43 comprises a spring 44 for exerting thrust on roller 37 when applying protective sheet 22; and roller 37 is preferably divided into a number of independent portions to effectively compress both the portion of protective sheet 22 on cutback 18, and the portions of the protective sheet overlapping first coating 13.

Extruder 36 comprises a tank 45, which comes out inside outlet 38 and is filled through inlet 39; a piston 46, which slides inside tank 45; a rod 47 fixed to piston 46; and an actuator 48 for moving rod 47 and piston 46 back and forth inside tank 45, towards outlet when extruding protective sheet 22, and in the opposite direction when extrusion is completed.

Coating unit 24 comprises an actuator 49 for rotating wheel 35 about axis A1; and an actuator 50 for moving carriage 33 parallel to axis A, and so moving wheel 35 and extruder 36 along rails 32 to selectively set extruder 36 to a feed position (shown by the dash line in FIG. 8), in which nozzle 31 of plastifying unit 25 is connected to inlet 39 of the coating unit, and a coating position (shown by the continuous line in FIG. 8), in which outlet 38 is located in close proximity to cutback 18.

Actuators 48, 49, 50 are preferably electromechanical, which are preferred to hydraulic or pneumatic actuators by not requiring piping which could impede the movement of coating unit 24, and by powering the moving parts by means of sliding contacts not shown in the drawings. Mechanically, actuators 48, 49, 50 may be defined by sprocket/rack, sprocket/gear, and screw/nut screw couplings.

With reference to FIG. 9, tank 45 comprises lateral walls 51; end walls 52; and heating elements 53 for maintaining a temperature which enables extrusion of protective sheet 22, and promotes adhesion of protective sheet 22 to second coat 20.

Figure 10:
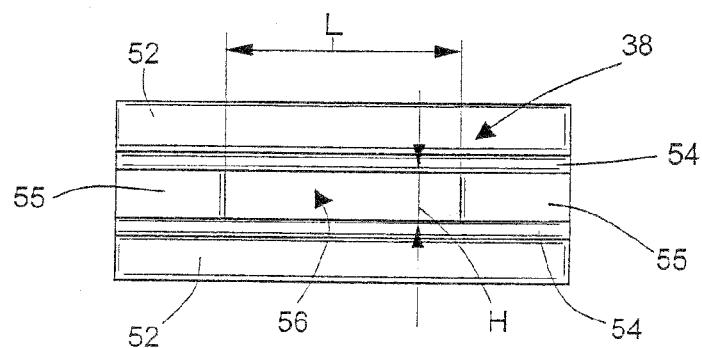
FIG. 10 shows a larger-scale plan view, with parts removed for clarity, of a component part of the FIG. 9 pipe-joining apparatus.

With reference to FIG. 10, outlet 38 is bounded by two plates 54 perpendicular to end walls 52, and by two prismatic bodies 55 gripped between plates 54, and so has a flow cross section 56 of height H defined by the distance between plates 54, and of width L defined by the distance between prismatic bodies 55.

Prismatic bodies 55 are gripped releasably between plates 54, to adjust the distance between prismatic bodies 55 and the width L of flow cross section 56.

The distance between end walls 52 may also be adjusted by inserting prismatic bodies 55 of a different thickness to adjust height H of flow cross section 56. These adjustments provide for adjusting the thickness and width of protective sheet 22 to the size of cutback 18. In an embodiment not shown, the prismatic bodies are bevelled to form a protective sheet 22 with bevelled lateral edges.

With reference to FIG. 8, pipe-joining apparatus comprises a control unit 57 for controlling the movement of underwater pipeline 2 with respect to joining stations 11, the movements and operation of coating unit 24, and operation of plastifying unit 25. More specifically, control unit 57 coordinates the rotation speed Vr of wheel 35, when applying protective sheet 22, with the displacement speed Vp of piston 46 at the extrusion stage, wherein piston speed Vp is related to the extrusion speed of protective sheet 22. The ratio between wheel speed Vr and piston speed Vp (tantamount to the extrusion speed of protective sheet 22) must be such as to avoid "stretching" (rotation speed Vr too fast with respect to piston speed Vp) or "folding" (rotation speed Vr too slow with respect to piston speed Vp) protective sheet 22 as it is applied.

Stretching of protective sheet 22 may be useful at the final stage to detach protective sheet 22 from outlet 38.

In actual use, and with reference to FIG. 1, vessel 1 advances in steps to feed the free ends 15 of pipes 3 or cutbacks 18 into joining stations 11, and stops when cutbacks 18 are located at joining stations 11. Pipe-joining apparatus 23 is located at the joining station 11 where third coat 21 is formed. With reference to FIG. 8, coating unit 24 is connected to polymer plastifying unit 25 as vessel 1 advances, and, when the vessel 1 stops, is located about a cutback 18, to which first coat 19 and second coat 20 have been applied in known manner. Piston 46 is moved forwards towards outlet 38 to expel the plastic polymer through outlet 38 and gradually form protective sheet 22. At the same time, wheel 35 is rotated about axis A1, which, at joining station 11, coincides with axis A of underwater pipeline 2. The displacement speed of piston 46 is synchronized with the rotation speed of wheel 35 to apply protective sheet 22 evenly as it is extruded. As it is wound, protective sheet 22—or, rather, the portion of protective sheet 22 that has just come out of outlet 38—is simultaneously compressed by roller 37 located close to and downstream from outlet 38 in the rotation direction of wheel 35. Wheel 35 and extruder 36 make one complete 360° turn, plus a further roughly 5° to overlap the opposite ends of protective sheet 22. At the overlap rotation stage, extrusion may be cut off or slowed down to "stretch" protective sheet 22 and reduce the thickness of the overlap end to detach protective sheet 22 from outlet 38.

Once protective sheet 22 is wound and pressed, extruder 36 is moved back into the feed position, and cutback 18 is fed to the next joining station 11, where outer coating 14 is bridged by applying bitumen or resin coat C in known manner (FIG. 6).

The present invention has numerous advantages, one of which being the considerable time saved in producing third coat 21—or, more generally speaking, a thick coat at ideal coating temperature—by simply extruding protective sheet 22 on site.

Another advantage lies in simultaneously extruding and winding protective sheet 22 onto cutback 18. Moreover, protective sheet 22 is compressed simultaneously as it is extruded and wound; and the method and pipe-joining apparatus 23 described allow of numerous adjustments, which make the invention highly versatile.

Obviously, pipe-joining apparatus 23 may be produced in a number of variations, in which:

a) plastifying unit 25 is movable to feed coating unit 24, as opposed to coating unit 24 moving to and from the plastifying unit;

b) both coating unit 24 and plastifying unit 25 are fixed, and are connected by a pipe, not shown in the drawings, connectable selectively to coating unit 24.

In another variation, not shown in the drawings, wheel 35 is supported for rotation by two jaws or belts connectable to underwater pipeline 2, on opposite sides of cutback 18.

Though the above description refers specifically to apparatus 23 installed on vessel 1, apparatus 23 may obviously form part of an on-land installation for joining standard-length pipes 3 into multiple-standard-length pipes 3, which are joined to form underwater pipelines 2 on a vessel for joining multiple-standard-length pipes 3.

The invention claimed is:

1. A pipeline field joint coating unit comprising:
an extrusion outlet of an extruder for extruding a protective sheet about a cutback area along a pipeline, wherein the extrusion outlet is positioned adjacent and facing the cutback area and dimensioned so that the protective sheet exceeds the axially extending width of the cutback area;
an extruder comprising a tank operatively connected to the extrusion outlet;
a roller configured to be advanced about the pipeline for compressing the protective sheet on the cutback area while simultaneously winding the protective sheet there about; and
a mechanism supporting the extruder, the extrusion outlet and the roller around the pipeline, the mechanism being configured to simultaneously advance the extruder, the extrusion outlet and the roller rotationally about the pipeline as the protective sheet is extruded from the extrusion outlet, and maintaining the position of the extrusion outlet relative to the cutback area.

2. The field joint coating unit as claimed in claim 1, wherein the roller is fitted to the mechanism to simultaneously apply and compress the protective sheet.

3. The field joint coating unit as claimed in claim 1, wherein the roller is supported by a further mechanism adjustably fixed to the mechanism to adjust the position of the roller with respect to the extrusion outlet.

4. The field joint coating unit as claimed in claim 3, wherein said further mechanism comprises a spring for exerting thrust on the roller when applying the protective sheet.

5. The field joint coating unit as claimed in claim 1, wherein the roller is preferably divided into a number of independent portions to effectively compress a respective portion of the protective sheet on cutback area, and the portions of the protective sheet overlapping a first coating.

6. The field joint coating unit as claimed in claim 1, wherein the extruder includes an inlet receiving the plastic material.

7. The field joint coating unit as claimed in claim 1, wherein the extruder includes a piston slidably positioned inside the tank; a rod fixed to piston; and an actuator for moving the rod and piston back and forth inside tank, towards the extrusion outlet when extruding the protective sheet, and in the opposite direction when extrusion is completed.

8. The field joint coating unit as claimed in claim 1, wherein the tank includes heating elements for maintaining a temperature which enables extrusion of the protective sheet.

9. A pipe-joining and coating apparatus comprising
a field joint coating unit;
a plastifying unit adjacent the field joint coating unit for plastifying and transferring a plastified polymer material to the field joint coating unit;
wherein the field joint coating unit comprises:
an extrusion outlet for extruding a protective sheet about a cutback area located between two joined pipes being formed into a pipeline, wherein the extrusion outlet is positioned adjacent and facing the cutback area;
an extruder comprising a tank operatively connected to the extrusion outlet; a roller configured to be advanced about the pipeline for compressing the protective sheet on the cutback area while simultaneously winding the protective sheet there about; and
a mechanism supporting the extruder, the extrusion outlet and the roller around the pipeline, the mechanism being designed to rotate the extruder, the extrusion outlet and the roller about the pipeline as the protective sheet is extruded from the extrusion outlet, and to maintain the position of the extrusion outlet relative to the cutback area; the extrusion outlet being dimensioned so as to exceed the axial width of the cutback area.

10. The apparatus as claimed in claim 9, wherein the plastifying unit plastifies the polymer material, originally in the form of granules or flakes, and comprises a hopper, a screw extruder, and a nozzle.

11. The apparatus as claimed in claim 9, wherein the plastifying unit has a fixed position with respect to the field joint coating unit.

12. The apparatus as claimed in claim 9, wherein the mechanism includes a first actuator for advancing the extruder, the extrusion outlet and the roller circumferentially about the cutback area.

13. The apparatus as claimed in claim 9, wherein field joint coating unit includes a second actuator for setting the extruder into a feed position, in which the plastifying unit is connected to the field joint coating unit for transferring the plastified polymer material.

14. The apparatus as claimed in claim 9, wherein the field joint coating unit is movable relative to the plastifying unit to permit feeding of plasticized material to the field joint coating unit.

15. The apparatus as claimed in claim 9, wherein the field joint coating unit and the plastifying unit are interconnected by a pipe.

16. The apparatus as claimed in claim 9, further comprising a control unit to control the movement and operation of the field joint coating unit, and the operation of the plastifying unit.

17. The apparatus as claimed in claim 16, wherein the control unit coordinates the rotation speed about the cutback area of the extrusion outlet, when applying the protective sheet, with the displacement speed of the piston at the extrusion stage.

18. The apparatus as claimed in claim 17, wherein the control unit relates the piston speed to the extrusion speed of protective sheet so as to avoid "stretching" or "folding" of the protective sheet as it is applied.

19. A pipeline field joint coating unit comprising:
an extrusion outlet for extruding a protective sheet about a cutback area located along a pipeline, wherein the extrusion outlet is positioned adjacent and facing the cutback area and dimensioned so that the protective sheet exceeds the axially extending width of the cutback area;

an extruder comprising a tank, which is connected to the extrusion outlet; a piston, which moves inside the tank; a rod fixed to the piston; and an actuator for moving the rod and piston back and forth inside the tank; a roller configured to be advanced about the pipeline for compressing the protective sheet on the cutback area while simultaneously winding the protective sheet there about; and a mechanism supporting the extruder, the extrusion outlet and the roller around the pipeline, the mechanism being configured to advance simultaneously the extruder, the extrusion outlet and the roller about the pipeline as the protective sheet is extruded from the extrusion outlet, and to maintain the position of the extrusion outlet relative to the cutback area.

20. The field joint coating unit as in claim 9 wherein the mechanism is movable axially between a first position at the plastifying unit and a second moved position aligned with the cutback area.

21. The field joint coating unit as in claim 1 wherein the mechanism comprises a wheel assembly having a central opening through which the pipeline is fed axially, the wheel assembly having a pair of spaced apart rings with the extruder being adjustably suspended there between, and a rotation drive to rotate the wheel assembly and the extruder in a circular path around the pipeline.

22. The field joint coating unit as in claim 9 wherein the mechanism comprises a wheel assembly having a central opening through which the pipeline is fed axially, the wheel assembly having a pair of spaced apart rings with the extruder being adjustably suspended there between, and a rotation drive to rotate the wheel assembly and the extruder in a circular path around the pipeline.

23. The field joint coating unit as in claim 19 wherein the mechanism comprises a wheel assembly having a central opening through which the pipeline is fed axially, the wheel assembly having a pair of spaced apart rings with the extruder being adjustably suspended there between, and a rotation drive to rotate the wheel assembly and the extruder in a circular path around the pipeline.

* * * * *